United States Patent [19]

Jones

[11] 4,278,844
[45] Jul. 14, 1981

[54] COMMUNICATION SYSTEM SELECTIVE CALL SCREENING ARRANGEMENT

[75] Inventor: David F. Jones, Middletown Township, Monmouth County, N.J.

[73] Assignee: Bell Telephone Laboratories, Incorporated, Murray Hill, N.J.

[21] Appl. No.: 23,741

[22] Filed: Mar. 26, 1979

[51] Int. Cl.³ .................. H04M 3/48; H04M 3/54
[52] U.S. Cl. .................. 179/18 B; 179/18 BE; 179/18 BG; 179/84 C; 179/99 A
[58] Field of Search .......... 179/18 B, 18 BE, 18 BG, 179/27 FD, 84 B, 18 D, 18 DA, 18 AD, 99, 84 C

[56] References Cited

U.S. PATENT DOCUMENTS

| | | | |
|---|---|---|---|
| 2,957,047 | 10/1960 | Wennemer | 179/18 BE |
| 3,508,011 | 4/1970 | Dehlen et al. | 179/27 FH |
| 3,534,176 | 10/1970 | Lipien | 179/27 CA |
| 3,544,729 | 12/1970 | Stevens | 179/18 BE |
| 3,626,109 | 12/1971 | Bartlett et al. | 179/18 BE |
| 3,651,270 | 3/1972 | Lee, Jr. et al. | 179/18 B |
| 3,654,396 | 4/1972 | Biezeveld | 179/18 D |
| 3,854,014 | 12/1974 | Akin et al. | 179/18 BG |
| 4,028,498 | 6/1977 | Mehaffey et al. | 179/18 GE |
| 4,150,257 | 4/1979 | Fenton et al. | 179/18 BE |

OTHER PUBLICATIONS

"DIMENSION Spectrum Expands with Custom Telephone Service", Horenkaup et al., *Bell labs. Record*, vol. 54, No. 10, Nov. 1976, pp. 274-280.

*Primary Examiner*—Thomas W. Brown
*Attorney, Agent, or Firm*—John A. Caccuro

[57] ABSTRACT

A call screening arrangement is disclosed for an intercom communication system in which call features are activated by entering a two digit code from the rotary or multifrequency dial of the connected station sets. Incoming calls to a called station are screened according to the type of call features activated at the called station. The particular call screening feature activated is determined by the order of the sequential activation of the existing Call Forwarding, Callback or Do-Not-Disturb call features. The call screening features enable incoming calls controlled by either a Call Forwarding or Callback feature to selectively bypass a Do-Not-Disturb call blocking feature at the called station. When activated individually the Call Forwarding, Callback and Do-Not-Disturb features perform their individual call control routines.

42 Claims, 13 Drawing Figures

INTERCOM OPERATION

FEATURE ACTIVATION CODES

| CODE | FUNCTION |
|------|----------|
| 00 | ATTENDANT RECALL |
| 01 | OVERRIDE |
| 02 | CALL FORWARDING |
| 03 | THREE-PARTY CONFERENCE |
| 04 | FOUR-PARTY CONFERENCE |
| 06 | DO NOT DISTURB |
| 07 | REMOTE ANSWER |
| 09 | CALLBACK |

S1 ACTIVATES CALL FORWARD TO SN

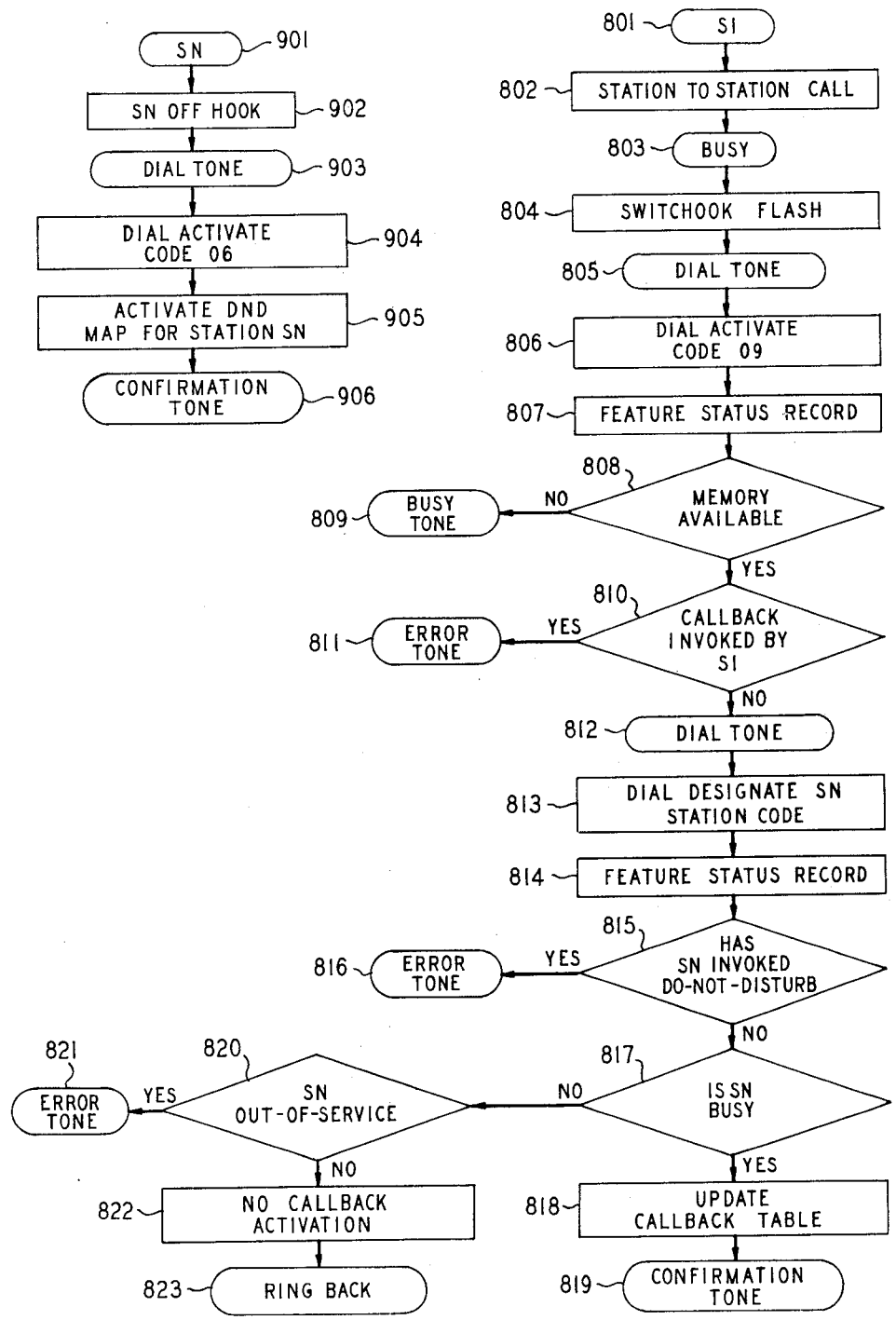

FIG. 12

| | FEATURE | CALL TO STATION | CALL TREATMENT STATION | CALL TREATMENT SIGNALS |
|---|---|---|---|---|
| 1201 | STATION SN TO STATION SI | SI | SI | L, R, V |
| 1202 | DND AT SI | SI | SI | L, V |
| 1203 | CFWD AT SI TO SN | SI | SI, SN | L, R, V |
| 1204 | ACBK AT SI | CALLBACK TO SI | SI | L, R, V |
| 1205 | CFWD AT SI TO SN<br>CFWD AT SN TO SJ | SI<br>SN | SI, SN<br>SN, SJ | L, R, V<br>L, R, V |
| 1206 | CFWD AT SI TO SI<br>ACBK AT SI | SI<br>CALLBACK TO SI | SI, SN<br>SI<br>SN | L, R, V<br>L, R, V<br>NOTHING |
| 1207 | CFWD AT SI TO SN<br>DND AT SN | SI<br>SN | SI, SN<br>SN | L, R, V<br>L, V |
| 1208 | DND AT SI<br>CFWD AT SI TO SN<br>DND AT SN | SI<br>—<br>SN | SI<br>SN<br>SN | NOTHING<br>L, R, V<br>L, V |
| 1209 | ACBK AT SI<br>DNB AT SI | CALLBACK TO SI<br>SI | SI<br>SI | L, R, V<br>L, V |
| 1210 | CFWD AT SI TO SN<br>DND AT SN<br>CFWD AT SN TO SJ | SI<br>SN<br>— | SI, SN<br>SN<br>SJ | L, R, V<br>NOTHING<br>L, R, V |
| 1211 | CFWD AT SI TO SN<br>DND AT SN<br>CFWD AT SN TO SJ<br>ACBK AT SN | SI<br>SN<br>—<br>CALLBACK TO SN | SI, SN<br>SN<br>SJ<br>SN<br>SJ | L, R, V<br>NOTHING<br>L, R, V<br>L, R, V<br>NOTHING |

WHERE L = VISUAL INDICATION
R = AUDIBLE INDICATION
V = VOICE CONNECTION

COMMUNICATION SYSTEM SELECTIVE CALL SCREENING ARRANGEMENT

TECHNICAL FIELD

This invention relates to a selective telephone call screening arrangement for use in a telephone communication system having telephone calling and receiving stations.

BACKGROUND OF THE INVENTION

Some modern telephone intercom systems interconnect with standard key telephone systems to provide both intercom and basic telephone service from the same station sets. The intercom systems provide a private communication network having a variety of telephone call features. In one type of intercom system these telephone call features are initiated by entering a two digit code from the rotary or multifrequency dial of the connected station set.

Additional call features are continually being added to enhance the telephone service and convenience of intercom systems. One such calling feature is called a Do-Not-Disturb feature. The Do-Not-Disturb feature enables a station to appear busy to incoming intercom calls. The desirability of more flexible call features had led to a selective Do-Not-Disturb feature which selectively blocks calls to a station.

In the prior art arrangements selective Do-Not-Disturb features are referred to as call screening or call restriction arrangements. The prior art call screening arrangements have selectively screened calls on a station, class-of-service or user basis. For example, in one arrangement the operation of a single key at the attendant's PBX console enables a class-of-service call restriction circuit. This class-of-service circuit results in specific limited telephone service to a particular group of telephones served by the PBX. In another arrangement a class-of-service call restriction system not only prohibits calls but determines the alternative destination of the attempted prohibited calls.

In still another system a call screening circuit blocks all calls to the called station unless the calling station provides a predetermined signaling code which inhibits the screening circuit. Thus, only those telephone calls in which the calling party initiates appropriate code signals, in addition to the called station's telephone number, will actuate the audible means to the called station. This circuit provides call screening on a "calling party" basis rather than a "station" basis. Hence, only calling parties knowing the called station selected signaling code can bypass the screening function and ring the called station. In addition, the selected code can be altered as often as desired by the called station.

In some situations the prior art selective call screening arrangements may be too static and not flexible enough. A telephone user may, for example, desire to screen incoming telephone calls according to the "type" of call received rather than on a calling party, class-of-service or station basis. Thus, the type of call screening could be determined by the particular features activated at a called station. For example, a telephone user may spontaneously desire to exclusively communicate, to the exclusion of all other incoming telephone calls, with a certain telephone location which is currently busy. Hence, a selective call screen must be activated by the user to inhibit the reception of all incoming calls except for the call back from the busy station. In the above example only the busy station can "callback" and selectively bypass the call screening feature and signal the called station. Thus, it would be desirable for a selective call screening arrangement to provide various dynamic selective call screening capabilities.

Accordingly, it is a problem to design a call screening arrangement which screens calls according to the type of call received at the called station.

It is an additional problem to selectively screen calls according to the particular call features activated at the called station.

It is a further problem to design additional call screening features into an intercom system without requiring the user to memorize the feature activation codes.

SUMMARY OF THE INVENTION

The above-identified problems as well as other problems are solved by the disclosed dynamic selective call screening arrangements. The disclosed call screening arrangements provide for dynamic selectivity by enabling a call screening capability to be engaged while other certain call features are currently activated.

The disclosed call screening arrangements are activated utilizing the existing mutually exclusive Call Forwarding, Callback and Do-Not-Disturb feature codes which are consecutively activated to enable the desired call screening arrangement. The resulting call screening features thus selectively screen incoming telephone calls to a called station such that the unscreened calls are selected according to the currently activated call features at the called station. The disclosed call screening arrangements are activated by dialing various combinations of the Callback, Do-Not-Disturb and Call Forwarding feature activation codes at one or more station sets.

The Call Forwarding feature enables the forwarding of audio and visual call alerting signals from a first station to a second station. The Callback feature provides an alerting signal to a first station (and a distinctive audible Callback signal when answered) from a previously called busy second station indicating a non-busy condition at the second station. The Do-Not-Disturb feature enables a station to appear busy to all incoming telephone calls.

A first embodiment of a call screening arrangement is enabled by the consecutive activation of a Call Forwarding feature at a first station followed by the activation of a Do-Not-Disturb feature at a second station designated to receive the forwarded call. The resulting Call Forwarding/Do-Not-Disturb call screening arrangement provides a Do-Not-Disturb function to all calls received at the second station except for calls which were forwarded from the first station.

A second call screening embodiment enables activation of a Callback feature at a first station followed by the activation of a Do-Not-Disturb feature at the same first station. The resulting Callback/Do-Not-Disturb call screening arrangement provides a Do-Not-Disturb function to all calls received at the first station except for Callback signals from the previously busy second station.

Other call screening embodiments which are activated by various combinations of the Call Forwarding, Callback and Do-Not-Disturb features are described in the detailed section of the specification.

Thus, it is a feature of the disclosed call screening arrangements to screen calls according to the type of calls received at the called stations.

It is a further feature to enable screening which depends on the particular call feature currently activated at a called station rather than being statically defined on a "station" or "user" basis.

It is an additional feature to provide for the initiation of a call screening arrangement by consecutive activation of the dialing codes of existing call features.

BRIEF DESCRIPTION OF THE DRAWINGS

The foregoing problem and solutions together with the operation and utilization of the present invention will be more apparent from the following description, taken in conjunction with the drawing in which:

FIG. 8 shows the sequence for activating an automatic Callback feature.

FIG. 9 shows the sequence for activating a Do-Not-Disturb feature.

FIG. 12 compares the various call screening arrangements of the invention with other system call features.

GENERAL DESCRIPTION—BACKGROUND

Before beginning a general discussion of the specific features claimed it may be helpful to review in general terms the operation of an overall system in which the claimed features can be utilized. It should be borne in mind that such features can be used in any number of similar type communication systems and thus only background information on one type of system will be presented. In addition, since communication system features may be used with different types of systems each dependent on different hardware constraints and upon different programming techniques, no attempt will be made to detail the entire program used to control the overall system as such would cloud the issue and unnecessarily lengthen this specification.

While the disclosed features are implemented as part of an intercom system it will, of course, be obvious to one skilled in the art that the features described and claimed herein can be used with many other communication systems. However, the features must be blended into the overall structure of the system in which it is used and must be tailored to mesh with all of the other features and operations of such a system. Thus, in order to avoid confusion and in order to allow those skilled in the art to utilize the invention claimed herein, this patent specification will concentrate on providing an understanding of the problems and constraints typically found in a communication system where the features may be used. The patent specification will provide the logical steps necessary for the implementation and blending of the described features into such a larger system, having many such features.

TYPICAL OVERALL SYSTEM OPERATION

Figure 1:
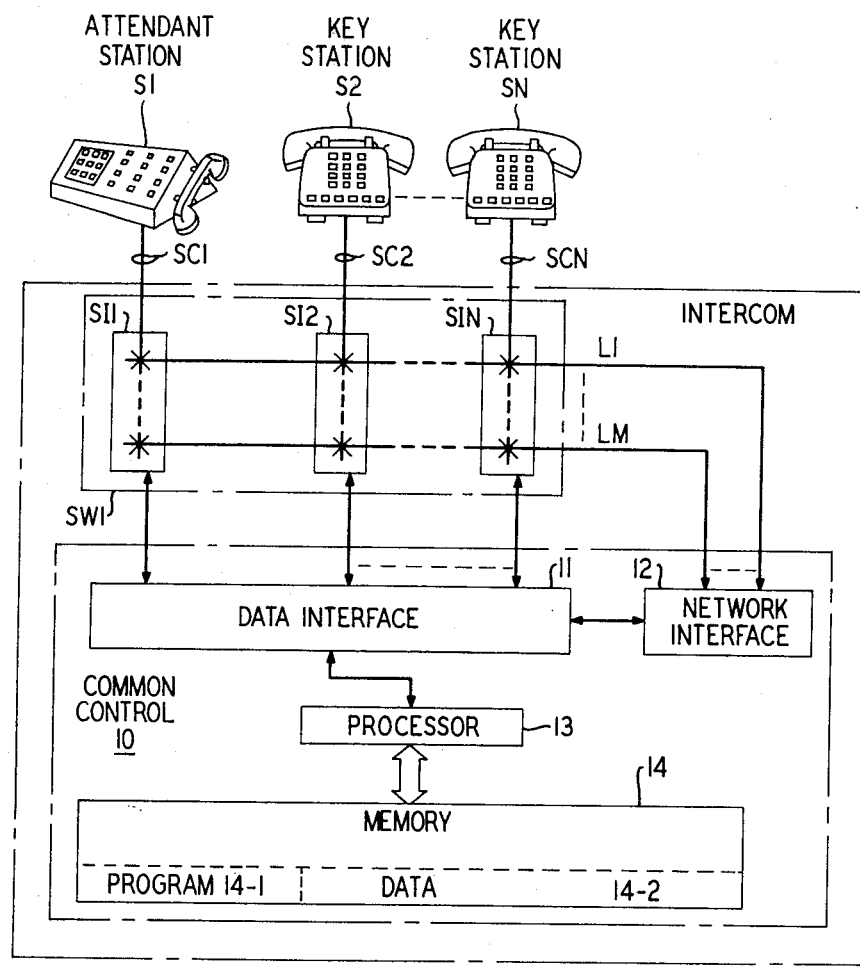
FIG. 1 shows an intercom system configuration having several multibutton telephones.

One such communication system where the features disclosed herein can be used is an electronic intercom having multiple dial addressable station sets and multiple intercom communication links controlled by a stored program common controller. As shown in FIG. 1, common control 10 connects to multiple addressable key station sets (S1–SN) through switching network SW1. Each station set (S1–SN) has a dialing capability for communications with other stations over intercom communication links (L1–LM). In addition the features of the intercom system are dial activated from each station set (S1–SN).

Although key telephone sets (SL–SN) are illustrated in FIG. 1 non-key telephone sets with an associated interface unit can be utilized with the intercom system by eliminating those features requiring a hold key operation. For example the use of the telephone station set described in my copending patent application E. T. Burke-D. F. Jones, Ser. No. 13,567, which is now U.S. Pat. No. 4,216,356 together with the telephone interface described in my copending patent application E. T. Burke-D. F. Jones, Ser. No. 13,566, which is now U.S. Pat. No. 4,220,827, can be utilized with the disclosed intercom system. The key telephone station sets (S1–SN) can have either a rotary or a multifrequency dial. One button and its associated lamp on each key station set (S1–SN) is dedicated for intercom use.

Basically, a typical intercom call from station set 52 to station set SN involves dialing a two digit station code associated with the called station set SN. Common Control unit 10 then selects and connects an intercom link (L1–LM) between the calling and called station and rings the called station set SN. The basic operation of the disclosed intercom system and some of its basic features are similar to the intercom system described in the article "A Versatile New Intercom System," *Bell Laboratories Record*, Vol. 38, pages 81–85, March, 1958 by H. T. Carter which article is incorporated herein by reference. The presently disclosed intercom system, however, is a more sophisticated, firmware controlled intercom system offering many additional features including the disclosed call screening features. These additional features are discussed with reference to FIG. 2.

Figure 2:
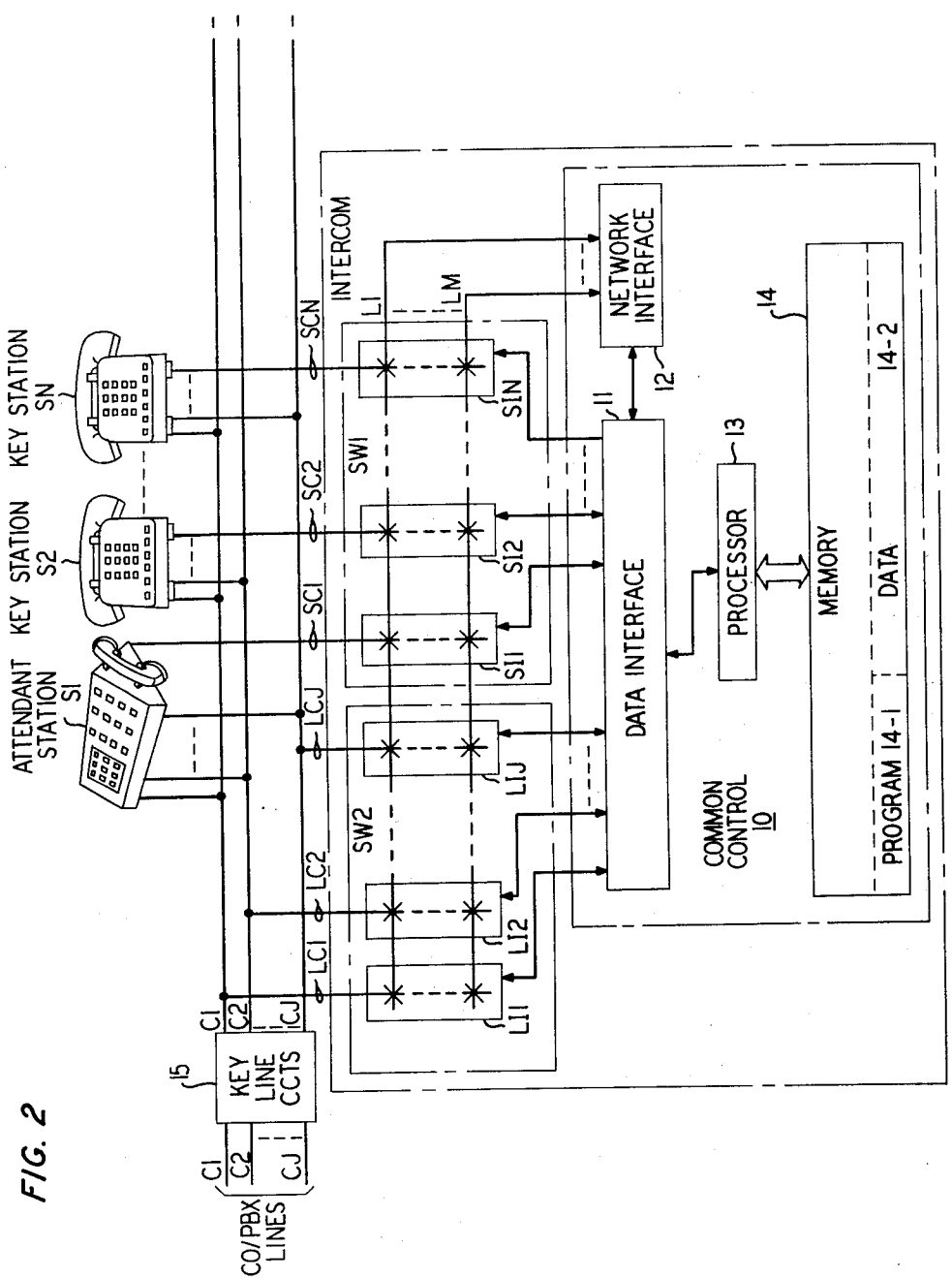
FIG. 2 shows an intercom system interconnected to a key telephone system.

As shown in FIG. 2, the intercom system shown in FIG. 1 can be connected as an adjunct to any key telephone system having A-lead control such as the 1A1 or 1A2 Key Telephone System (KTS). Note, the use of an interface would enable the intercom to connect to key telephone systems not having A-lead control. A basic description of the well known 1A2 KTS is contained in the article "Key Telephone Systems: The Latest Chapter, "*Bell Laboratories Record*, Vol. 44, pages 85–88, March 1966 by W. F. B. Wood which article is incorporated herein by reference. A detailed discussion of the operation of a typical line circuit of a key telephone system is contained in U.S. Pat. No. 3,840,710 which patent is hereby incorporated by reference.

In the arrangement shown in FIG. 2 switching network SW2 enables connection between central office or PBX lines (C1–CJ) and intercom links (L1–LM) under the control of common control 10. In the arrangement shown in FIG. 2 up to J CO/PBX calls can be answered, held or transferred using the intercom. Note that calls over the CO/PBX lines cannot be originated using the intercom lines. However, as shown in FIG. 2, the station sets (S1–SN) could originate an outgoing call on any CO/PBX lines (C1–CJ) to which they have a direct connection.

A nine conductor cable (SC1–SCN) connects between station sets (S1–SN) and station interfaces (SI1–SIN) and includes a voice facility pair, buzzer pair, lamp pair, H, BL and A control leads. The H-lead transmits hold request information, the BL-lead transmits the station on-hook/off-hook status and the A lead provides the on-hook/off-hook status of the voice pair line assigned to the intercom (i.e., pick-up key status "anded" with BL lead status).

The station interfaces (SI1–SIN) provide both access to the intercom links (L1–LM) as well as the visual and audible signaling required by the key telephone station sets (S1–SN). The station interfaces (SI1–SIN) also provide administration and maintenance of the busy and hold features of the station sets (S1–SN).

The line interface units (LI1–LIJ) isolate the intercom from CO/PBX link potential while detecting and acknowledging CO/PBX loop supervisory signals. The cables (LC1–LCJ) carry lamp and A lead signals between the line circuits (15) of the key telephone system and the disclosed intercom system. The line interface units (LI1–LIJ) have only the capability of incoming call intercept and thus restrict outward dialing services from the intercom.

Network interface (12) provides the stations (S1–SN) with operating currents, link status indication for call supervision and dial-pulse detection, as well as link (L1–LM) multiplying capability for conference applications. The flexible switching properties of the line interface units (LI1–LIJ), station interface units (SI1–SIN) and network interface (12) provide for a variety of call configurations. Network interface (12) also provides a multifrequency receiving capability and a call progress tone generating capability.

Data interface unit (11) provides input/output interfacing between the system processor (13) and the network interface (12), line interface units (LI1–LIJ) and station interface units (SI1–SIN).

The system processor (13) is a microprocessor such as Intel's 8080 which performs a program contained in memory unit (14). Memory unit (14) includes both read-only memory (ROM) for program store (14-1) and random access memory (RAM) for data storage (14-2).

The call processing program utilized in the disclosed intercom is a high level executive program which controls the order of tasks executed by the processor (13). While the executive program which operates the disclosed intercom system is not the standard executive program available from the microprocessor manufacturer, such a standard executive program could be utilized.

The call processing program of the disclosed intercom system is structured as a simple polling algorithm organized into several autonomous work modules. These modules can be processed sequentially regardless of state (active or dormant), on a 25 msec schedule. Thus, every 25 ms the chain of sequential modules in the call processing program are executed. The scheduling algorithm satisfies system time-dependent functions and ensures the processing of any one module without unscheduled interruption.

Basically the call processing program modules detect a user going off-hook, accept the user's rotary or multi-frequency call feature activation code, update the appropriate memory records, arrange for the proper switching link connections, provide signaling to the called party and complete or terminate the call.

BASIC CALL PROCESSING

Call processing tasks are isolated by time and function and organized into two orthogonal processes—call routing and call supervision. Call routing tasks are allocated to registration algorithms and include dial interpretation, translation, feature processing and call linkage. Call supervisory tasks are allocated to a scanning algorithm and pertain to seizure, answer, disconnect and system recell.

The call processing tasks are desitned to interact through dedicated status memories without time dependencies. Call parameters pertinent to the call routing sequences are passed as assignment vectors (identifying the calling station (S1–SN) and the link (L1–LM) to which the station is assigned) to the registration program. The parameters coupled with dialed information suffice to complete the call to the following:

a. A called facility,
b. a call progress tone,
c. translation memory,
d. or any combination of the above.

If the call is routed to a facility (SC1–SCN) the call state and link (L1–LM) identity parameters are passed to the supervisory scanning program via the records discussed below.

Call parameters relevant to supervisory processes have been partitioned into two categories:

a. Those parameters pertinent to call status (e.g., link validity, "flash" progress, etc.), which are contained in link status record (LSR) of FIG. 6.
b. Those parameters pertinent to facility (SC1–SCN) status (e.g., past activity, link association, etc.), which are passed in facility status record (FSR) of FIG. 6.

Call processing control rests with the aforementioned orthogonal processes and the call parameters contained in the above records. The call processor programs examine these records and take action as a result of any new information (reported as call stimuli, of either the dialed or supervisory type) plus the call parameters contained therein.

Translation data pertinent to the call participants are determined during registration (via translation memories) and not reported to either the LSR or FSR records. Note, the term translation memory usually refers to a fixed data base and is unconventionally used herein. Calls are completed in memory (via the aforementioned records) and the actual connection (and call state) executed by data interface (11).

RAM MEMORY

This section described the data store memory (14-2) implemented by RAM memory devices. Note, the call processing programs (14-1) are stored in ROM memory devices. The data store RAM memory is partitioned into status tables (shown in FIG. 6), feature records (shown in FIG. 5) and scratch pad memory (not shown).

Figure 6:
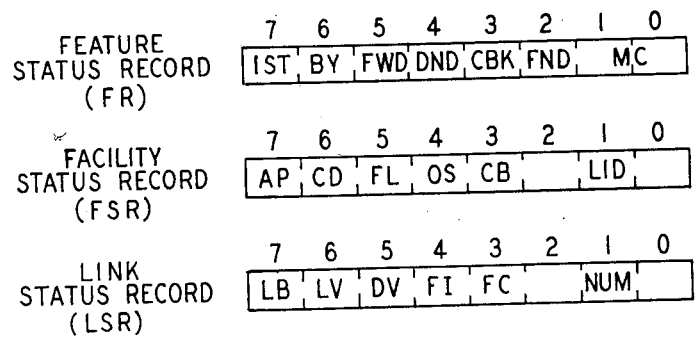
FIG. 6 shows the station and link status records.

The status records of FIG. 6 contain the primary information required by the call processing algorithms. As shown in FIG. 6, a status record denoted as the facility status record (FSR) stores the status of each facility (SC1-SCN). A 2-bit binary encoded field (AP, CD) defines facilty call status (idle, alert, busy) and a 3-bit field (FL, OS, CB) used for indicating flashing, out-of-service and call back state characterization. The LID parameter associates the facility (SC1-SCN) call status with a particular link (L1-LM) status record (LSR of FIG. 6).

The call parameters contained in the bulk status record (LSR) are shown in FIG. 6. A 2-bit binary encoded field (LB, LV) defines link call status (such as idle, valid or transient link) and a 3-bit field (DV, FI, FC) performs flash administration functions (such as flash completed, initiated or disconnected). The remaining 3-bit field (NUM) maintains a binary encoded record of the number of call participants.

There is a LSR record allocated for each intercommunication link (L1-LM). Associated with each LSR are three records which perform the following timing functions:
a. A sanity timer which monitors the aforementioned call validity conditions.
b. A timer which monitors the application of station audible signals and is administered by stations which have returned answer supervision. This timer is assigned on a per link basis.
c. A timer used to monitor flash/disconnect functions.

The station feature status records (FR) shown in FIG. 6 are assigned to the Callback (ACBK), Call Forwarding (CFWD) and Do-Not-Disturb (DND) features, which require memory to sustain their activation. Note other system features are served by the previously mentioned transient scratch pad memories allocated to the originating register. These feature status records are established when a feature is requested by the user dialing the feature activation code.

Figure 5:
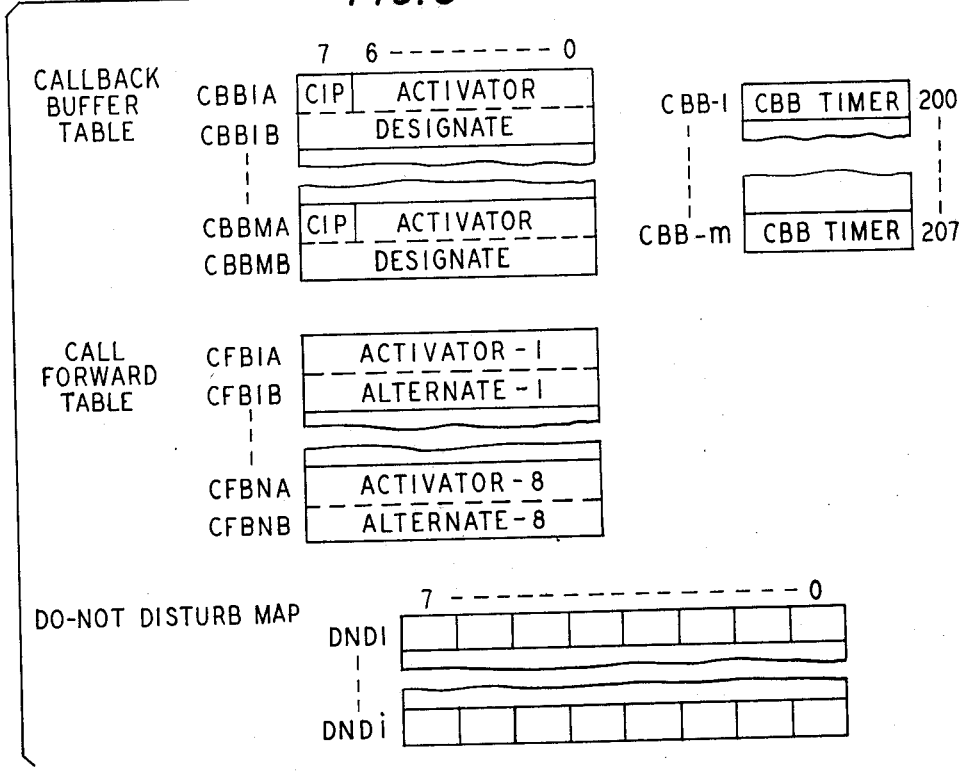
FIG. 5 shows the tables for storing Callback, Call Forward and Do-Not-Disturb requests.

The callback buffer table (CBB) shown in FIG. 5 consists of three words, two of which contain call linkage information (in the form of activator/designate station data). A timing function is performed by the third word (CBB Timer) which monitors the callback feature for activator abandonment. If the activator (party initiating the feature) fails to respond (return answer supervision) to a callback within 16-seconds the call will be abandoned and CBB released for a new assignment. The CBB table can be designed to handle many simultaneous ACBK requests and requires three words of memory for each request.

The call forward table shown in FIG. 5 contains two words of memory for each Call Forward (CFWD) request. One word contains the activator station address and a second word contains the alternate (station to which calls are forwarded) station address. The number of simultaneous CFWD requests desired to be handled by the system determines the size of the call forward table.

The Do-Not-Disturb (DND) feature does not require the maintenance of call linkage information and hence only a bit map (shown in FIG. 5) is utilized to provide station-to-feature associations. Feature activation is indicated if the bit corresponding to that station is reset (=0). The size of the DND map is determined by the number of stations (S1-SN) handled by the intercom.

As previously mentioned scratch pad memories (not shown) are reserved for program parameter passing, state maintenance or timing type functions.

INTERCOM SYSTEM DETAILED OPERATION

All station intercom calls require a two digit dial code to be entered by the user. To originate a Station-to-Station call the calling station goes off hook and dials the two digits (the first digit not being a zero) corresponding to the desired station. The called station receives a repeated buzzer signal (1 second on followed by 3 seconds off) and a flashing lamp signal. If the called station is busy on a CO or PBX line the audible is blocked. The calling station receives audible ring back. When the called station goes off hook the audible is silenced and the lamp changes from flashing to steady.

An intercom call can be held by an operation of the station HOLD key. In the hold condition the intercom lamp gives an appropriate wink signal. Other features such as Consultation hold, Call Transfer and CAll Add-On are also included in the intercom system operation but are not described herein.

Figures 3, 4:
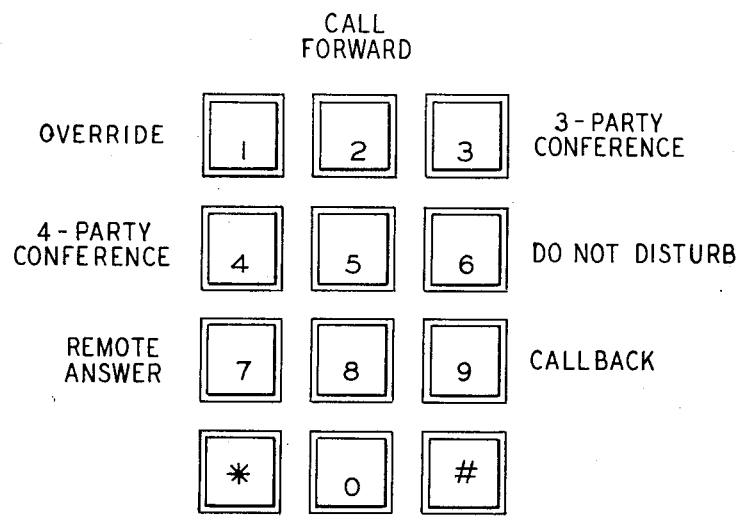
FIG. 3 shows a pictorial representation of the multifrequency dial pad of an intercom key telephone station set.
FIG. 4 shows the feature activation codes used by the intercom system.

The above features as well as the dial activated call features shown in FIG. 4 utilize call progress tones to indicate to the user the status of the call feature requested.

The following call progress tones are provided:
a. Intercom Dial Tone—(128 Hz-continuous)
b. Audible Ring Back (ART)—(256 Hz-1 second on—3 seconds off)
c. Intercom Busy Tone (BT)—(128 Hz-½ second on—½ second off)
d. Error Tone—(256 Hz and 512 Hz-alternately switched at ½ second intervals)
e. Remainder Tone—(dial tone interrupted at 75 ms intervals during first 1¼ seconds). It is provided as a reminder to the station user that a feature has been activated.
f. Override Tone—(128 Hz-continuous ½ second). Provided to a called station that is busy on an intercom call and entered by means of override. It is an indication that privacy has been broken.
g. Confirmation Tone (CR)—(128 Hz-continuous for ¼ second). Provided when a feature has been activated. It is a confirmation that the intercom has received and stored the feature instructions.
h. Hold Tone—(128 Hz-250 ms on—250 ms off for 1 sec. duration, followed by steady dial tone). This tone is used to acknowledge the consultation hold state.

CALL FEATURE ACTIVATION

All call features are activated by a two digit code that begins with a zero. In FIG. 3 the various call feature codes are illustrated relative to the multifrequency dial. In FIG. 4 the call feature codes are listed with their associated functions. Note, the certain possible codes, notably 05 and 08 have not been used. With reference to FIG. 3 it is seen that it would be difficult to associate a label with either the 05 and 08 code. Requiring the user to either use a call feature look up table or to memorize the feature code was felt to be too burdensome and hence codes 05 and 08 are used by the intercom for other than call feature codes. The function of the various features of FIG. 4 are described in later paragraphs.

A typical sequence of operation required to activate a call feature at a station is as follows:
a. off hook on an intercom facility (SC1-SCN)
b. receive intercom dial tone
c. dial activation code for the desired feature (FIG. 4)
d. receive intercom dial tone e. dial code of station to be the designate of the call feature
f. receive confirmation tone Note, the sequence for a particular call feature may vary somewhat from that which is listed above. Only the particular operating sequences associated with the claimed features will be discussed in more detail in subsequent paragraphs.

The basic functions performed by the features listed in FIG. 4 is described briefly below. The description of the features below is intended only to provide a background for the type of intercom feature environment in which the claimed features operate.

00 Attendant Recall (Outside)
An outside attendant recall feature permits recall of an attendant external to the intercom system.

01 Override
This feature permits selected stations to join a busy station's conversation by dialing the override code followed by the desired station code. This featue also overrides a station in the Do-Not-Disturb mode.

02 Call Forwarding
Intercom calls intended for a user's station can be routed to other stations by dialing the Call Forwarding code followed by the destination (alternate) station's intercom code. However, as shown in 1203 of FIG. 12, a falshing lamp and buzzer will be activated at the user's station for 12 seconds allowing pick-up at either the user's or alternate station. Call Forwarding can only be cancelled from the user's activating station, and cannot be cascaded to a third station by activating Call Forward at the alternate station.

03,04 Three and Four Party Conference
This feature provides the user with a fast, fully flexible conference service. Two activate codes have been assigned to this feature depending on whether it is to be a 3-party or 4-party conference (including the originator). The activation code for the 3-party conference is 03, and for the 4-party conference it is 04. Feature activation requires the dialing of one of the above codes followed by the intercom codes of the desired conferees.

06 Do-Not-Disturb (DND)
This feature allows the user to make the intercom station appear busy to incoming intercom calls (except Override) by dialing the DND code. As shown in 1202 of FIG. 12 the lamp will flash at the user's originating station on incoming calls as an indication that the feature is in effect.

07 Remote Answer
Permits a station to answer an intercom call intended for another station, while the call is in a ringing state, by dialing the Remote Answer code and the ringing station's intercom code.

09 Callback (ACBK)
Permits a user who has encountered a busy intercom station to automatically be called back and a connection established when both stations become idle. This feature is enacted by dialing the ACBK code and the busy station's intercom code. The resulting signaling to the called station is shown in 1204 of FIG. 12.

A more detailed discussion of the Call Forwarding, Do-Not-Disturb, and Callback as they are implemented in the disclosed embodiment is described hereinafter.

Call Screening Features

A. Call Forwarding with Do-Not-Disturb (CFWD+DND)

Figure 7:
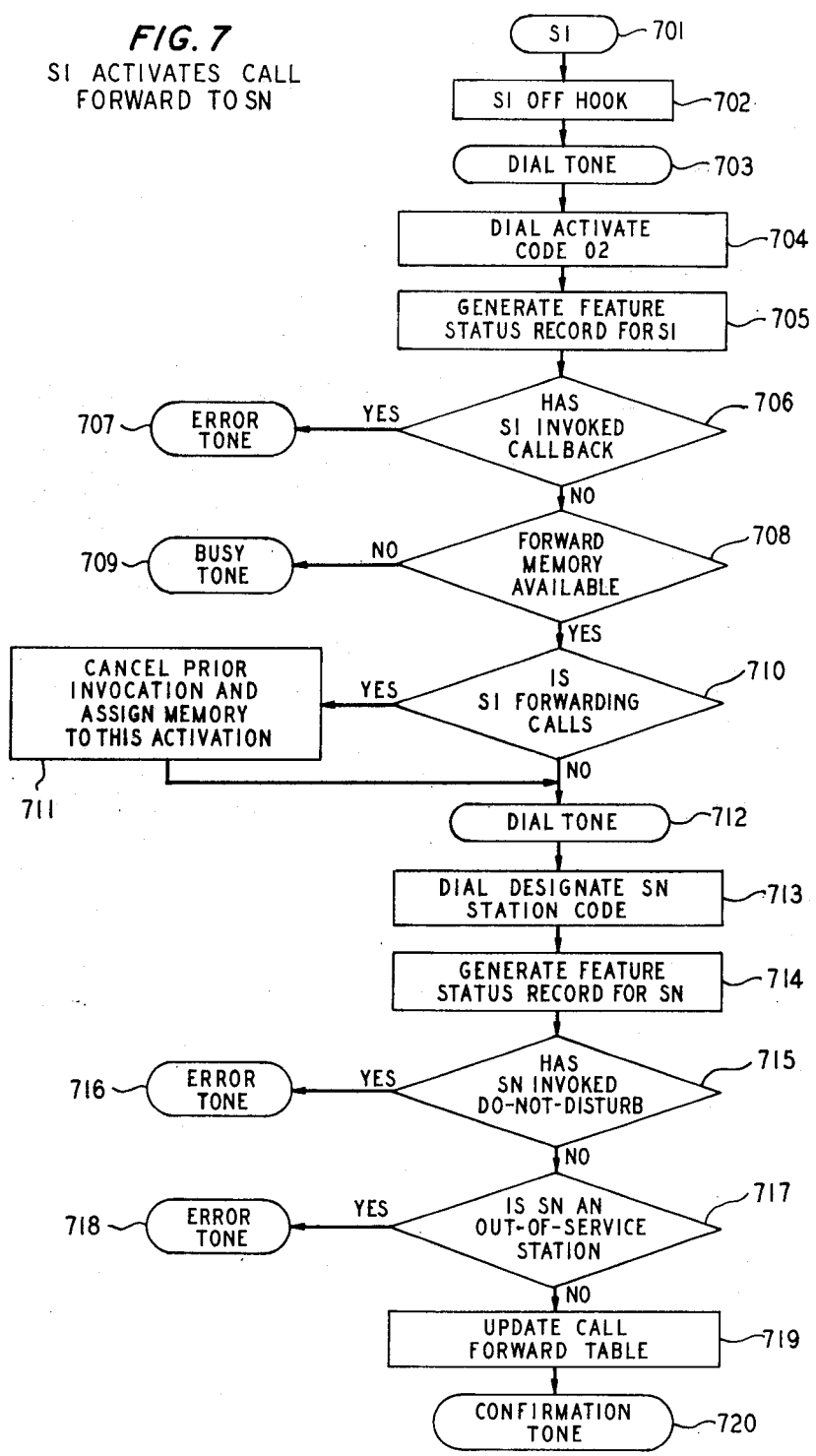
FIG. 7 shows the sequence for activating a Call Forward feature.

As illustrated in 1207 of FIG. 12, this feature enables the user a called station to receive visual (lamp) and audible (ringing) signaling from a forwarded call while preventing any audible signaling from a direct call to the called station. The sequence of operation required to activate the Call Forwarding with Do-Not-Disturb features is shown in FIG. 7. Station S1 the activator station (701) goes off-hook (702) and receives intercom dial tone (703) from the intercom. A Call Forwarding feature is activated by the user at station S1 by dialing a two-digit code 02 (704). The intercom generates a station feature status record (705) of the type (FR) shown in FIG. 6. The feature status record is generated by checking the status of the callback table, call forward table and DND map of FIG. 5. If station S1 has activated any of these features the respective bits CBK, FWD and DND bits will be set to logic 1 in the feature status record of FIG. 6. Feature status record also includes a "1st" bit which indicates registration of the first digit of the two digit code. A busy (BY) bit is set if the called station were busy. The FND bit is associated with feature cancellation procedures. The MC bits denote either the number of feature related called participants, or the number of tone applications to station S1 during feature activation procedures.

The intercom then checks the convenient feature status record for station S1 and determines if a call back feature is activated (706 of FIG. 7). If so, an error tone is returned to the user at station S1 indicating an improper feature activation. The operating system checks (708) the call forward table of FIG. 5 to determine if memory (CFB1A-CFBNB) is available to store another call forward request. Depending on the size of the call forward table this step may not be required. If no memory is available, a busy (BY) tone is returned to station S1 (709). The feature status record of FIG. 6 is checked (710) to determine if the FWD bit 5 is set indicating if station S1 is forwarding calls. If the answer to above inquiry is yes, then the contents of the memory words of the call forward table which are storing the prior request are assigned to this new request (711). An intercom dial tone (712) is then sent to station S1 indicating that the next request can be entered. The user at station S1 enters the code of station SN to whom the calls are to be forwarded. A feature status record (714) is created for station SN and a check is made (715) to see if a Do-Not-Disturb feature has been activated at station SN. If the answer is yes, then an error tone (716) is returned to station S1 indicating an improper request. The facility status for record station SN is then checked (717) for an out-of-service (OS) status. If an OS condition exists an error tone (718) is returned to the station S1, otherwise station S2 is entered in the memory location of the call forward table of FIG. 5 associated with this call forward request. A confirmation tone (720) is returned to station S1 indicating a valid Call Forward feature activation.

The activation of the CFWD+DND feature will be completed when the user activates a Do-Not-Disturb feature from called station SN. With reference to FIG. 9, the user goes off-hook (902) receives intercom dial tone (903) and dials the Do-Not-Disturb feature code 06 (904). The bit of the DND map of FIG. 5 associated with station SN is set at logic 0. The intercom returns a confirmation tone (906) to station SN indicating a successful DND feature activation. The signaling that results at the various stations during a CFWD+DND feature activation is shown in 1207 of FIG. 12. Note the calls made to station S1 are forwarded to station SN and provide audible and visual signaling at station SN while calls made to station SN are screened such that no audible signaling results at station SN.

As shown in 1208 of FIG. 12, if a DND feature is activated at station S1 prior to the previously described CFWD+DND feature an additional call screening results at station S1. The result of this DND+CFWD+DND feature activation, as shown in 1208, is that no intercom calls (including Override) produces an audible or visual signal at station S1 with the exception that a call from the call forward (alternate) station SN will cause a flashing of the intercom lamp at the activating station S1. The call forward alternate station SN receives a busy tone when attempting to call the activating station S1 unless the alternate station SN has also activated the Override feature which causes normal lamp and buzzer activity at the activating station S1. Stations, other than the alternate station SN, cannot reach the activating station S1 by activating the Override feature. All attempts by other stations to Override this feature will result in the call being forwarded to the alternate station SN.

B. Callback with Do-Not-Disturb (ACBK+DND)

This feature, as shown in 1209 of FIG. 12, allows the user at a called station to prevent an audible indication signal from all intercom calls except those from the callback station. As shown in 1209 of FIG. 12 the ACBK+DND feature is activated by activating a Callback (ACBK) feature with a desired busy designate station followed by an activation of a Do-Not-Disturb (DND) feature. The result is that intercom calls (except Override) will not be allowed through the DND screen except the call resulting from the Callback.

As shown in 803 of FIG. 8 the ACBK feature is not activated unless the designate station is busy. Thus, an attempt to complete a station-to-station call between station S1 and SN must be originated first. The origination of a station-to-station call, as described in an earlier paragraph, is attempted between station S1 and station SN (802). When station SN is busy the user at station S1 can go on-hook and then off-hook (re-originate, not illustrated in FIG. 8). More typically the user can switchhook flash (804) during the reception of the busy tone (803) to begin the activation of an Automatic Callback (ACBK) feature as shown in FIG. 8. After receiving dial tone (805) station S1 then activates the dial code 09 (806) associated with the ACBK feature. A feature status record (807) as previously described, is generated for station S1 and the callback buffer table of FIG. 5 is checked (805) for available memory to store the callback request. If no memory is available a busy tone (809) is returned to station S1. If memory is available the existence of a prior callback request is checked (810) in the previously generated feature status record of FIG. 6. If the answer is yes, then an error tone (811) is returned to station S1 otherwise a dial tone (812) is returned to station S1. The user at station S1 then enters the designate station SN code (813). The operating system then generates a feature status record (814) for station SN.

The status record table is checked (814) for the existence of a DND condition at station SN. If a DND condition exists, an error tone (816) is returned to station S1, otherwise the busy status of station SN is checked (817). If station SN is busy its address is stored in the designate address location (818) associated with the activator station S1 location. A confirmation tone (819) is then returned to station S1.

If station SN was not busy its facility status record would be checked (820) for an out-of-service (OS) status. If station SN is out-of-service an error tone (821) is returned to station S1, otherwise no Callback feature is activated (822) and a ringback tone (823) is sent to station S1.

If an ACBK feature is activated (818) a timer (CBB1-CBBm of FIG. 5) will be associated with the feature. When station SN becomes available (no longer busy) activator station S1 is alerted and if station S1 fails to return supervision (go off-hook) within a fixed period of time the ACBK feature is abandoned and the associated memory locations made available for a new ACBK request.

Figures 10, 13:
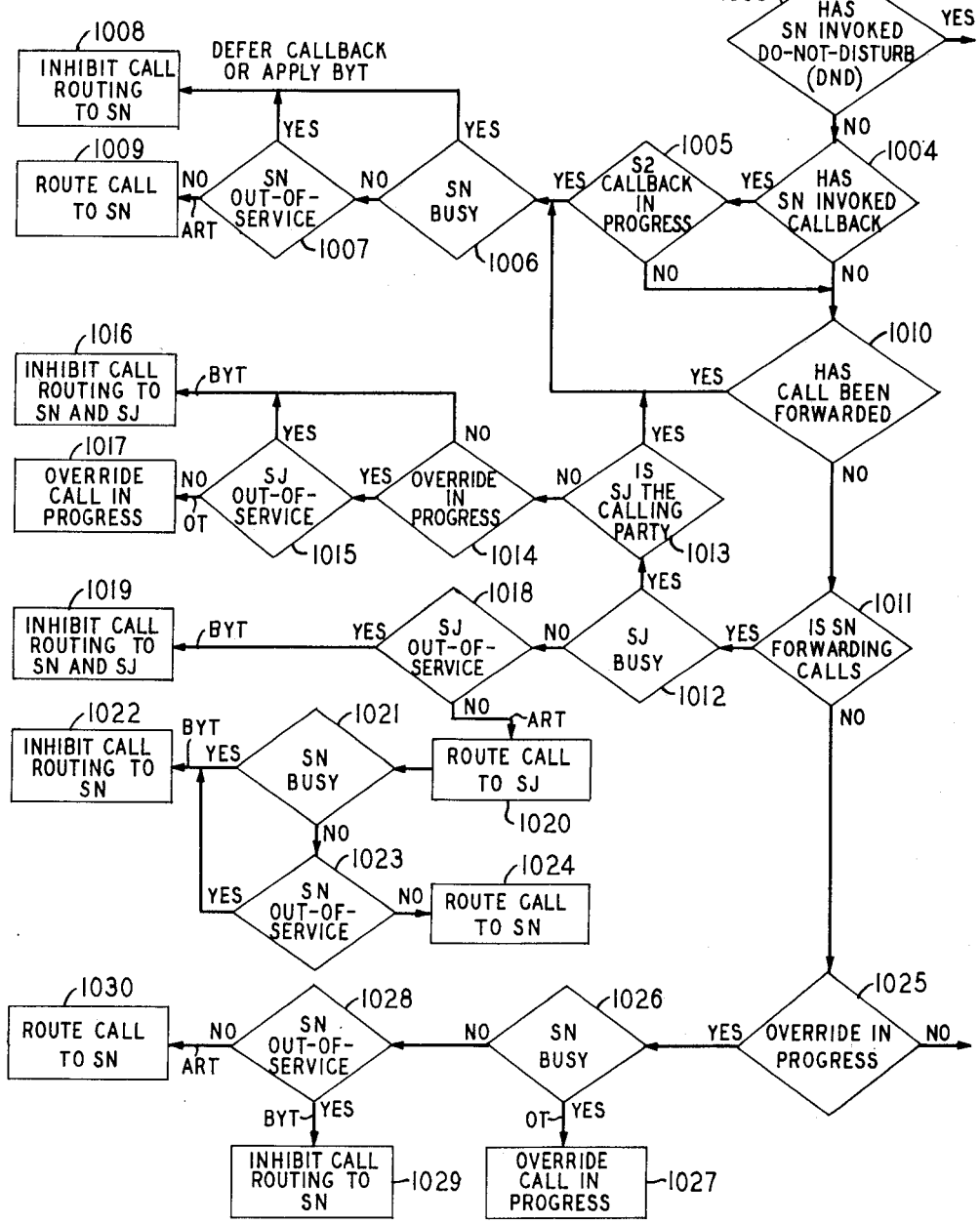
FIGS. 10 and 11 show the control steps for implementing the various call screening features.
FIG. 13 shows the arrangement of FIGS. 10 and 11.

If station S1 does not want to be disturbed by any phone call other than the return call from station SN the Do-Not-Disturb (DND) feature can be activated thus establishing the ACBK-DND selective screening feature. The DND feature is activated as shown in FIG. 10 and as described in a prior paragraph.

The resulting ACBK-DND feature makes station S1 busy to all intercom calls other than the callback from station SN.

CALL SCREENING FEATURE IMPLEMENTATION

The following paragraphs describe the sequence of steps which occur when station S2 attempts to complete an intercom station-to-station call to station SN which may have activated the above-described CFWD-DND or ACBK-DND screening features. Station S2 goes off-hook and dials the two digit dial code associated with station SN. The intercom system performs the sequence illustrated in FIGS. 10 and 11 to determine which station or stations should receive the audible and visual call alerting signals as a result of the station-to-station call between station S2 and station SN. A feature status record (1102) is generated for station SN and the Do-Not-Disturb (DND) bit is checked (1003).

If the DND bit is logic 0, no screening has been activated. The following describes how the activated features are implemented. The callback bit (CBK) of the feature status record is checked (1004). If the callback bit is logic 1 the callback buffer table is checked (1005) to determine if a callback is in progress (bit CIP at logic 1). The busy status of station SN is then checked (1006) and if busy, a busy (BYT) tone is returned to calling party S2 (1008). If station SN is not busy the out-of-service bit (OS) of the facility status record (FSR) for station SN is checked (1007) and if positive (logic 1) a busy (BYT) tone is returned to calling party S2 (1008). If OS bit is logic 0 then the visual and audible signaling is directed to station SN (1009). If a callback was not in progress (1005) then the system inquires if this call is a forwarded call (1010), if so, then the busy status of station SN is checked (1006) otherwise the feature status record is checked for the existence of a call forwarding request (FWD bit=logic 1) at station SN (1011). If FWD bit is logic 1 then status SJ, the alternate station to which calls to station SN are forwarded, is checked for a busy status (1018). If station SJ is busy an inquiry is made if station SJ is the calling party (1013). If station SJ is the calling station the call will be directed back to station SN (1031), if not then the Override feature status at station SN is checked (1014). If no Override feature is in progress then the call from station S2 is inhibited from reaching either station SN or SJ (1019) and a busy tone is returned to station S2. If an Override feature is in progress the out-of-service (OS) status of station SJ is checked (1015). If station SJ is out-of-service a busy tone is returned (1016) otherwise a confirmation tone (CT) is returned (1017) to calling station S2.

If station SJ is not busy (1012) the out-of-service (OS) status bit is checked (1018) and if bit is set a busy tone is returned to calling station S2. If station SJ is not out-of-service (1018) the call is routed to station SJ (1020). Note as discussed previously with regard to call forwarding calls, both the addressed station SN and the alternate station SJ receive lamp and audible signaling. Thus station SJ receives an audible tone and visual signaling (1020). The system also inquires into the busy status (1021) and out-of-service status (1023) of station SN to determine if it should receive visual signaling (1024). If station SN is either busy or out-of-service, station SN is not included in the call routing (1022).

It station SN is not forwarding calls (1011) the override status is checked (1025). If an override is in progress then the busy status of station SN is checked (1026). If station SN is busy indicating that the dialed station is busy on a call, override tone is transmitted to station SN. If station SN is not busy (1026) then its out-of-service status is checked and if out-of-service a busy tone (1029) is returned to station S2, or if not out-of-service an audible ringback tone is returned (1030). The audible ringback tone (ART) indicates to the calling party that the called party's line is ringing.

If no override is in progress (1025) then with reference to FIG. 12 the busy status of station SN is checked (1224). If station SN is busy a busy tone (BYT) is returned to station S2 (1225), otherwise the out-of-service status of station SN is checked. If station SN is out-of-service a busy tone is returned (1225), otherwise the call is routed to station SN and an audible ringback tone (ART) is returned to calling station S2.

The key question that the controller asks of station SN is whether a Do-Not-Disturb feature has been activated (1003). The prior paragraphs have described the condition when no prior Do-Not-Disturb feature has been activated at station SN.

Figure 11:
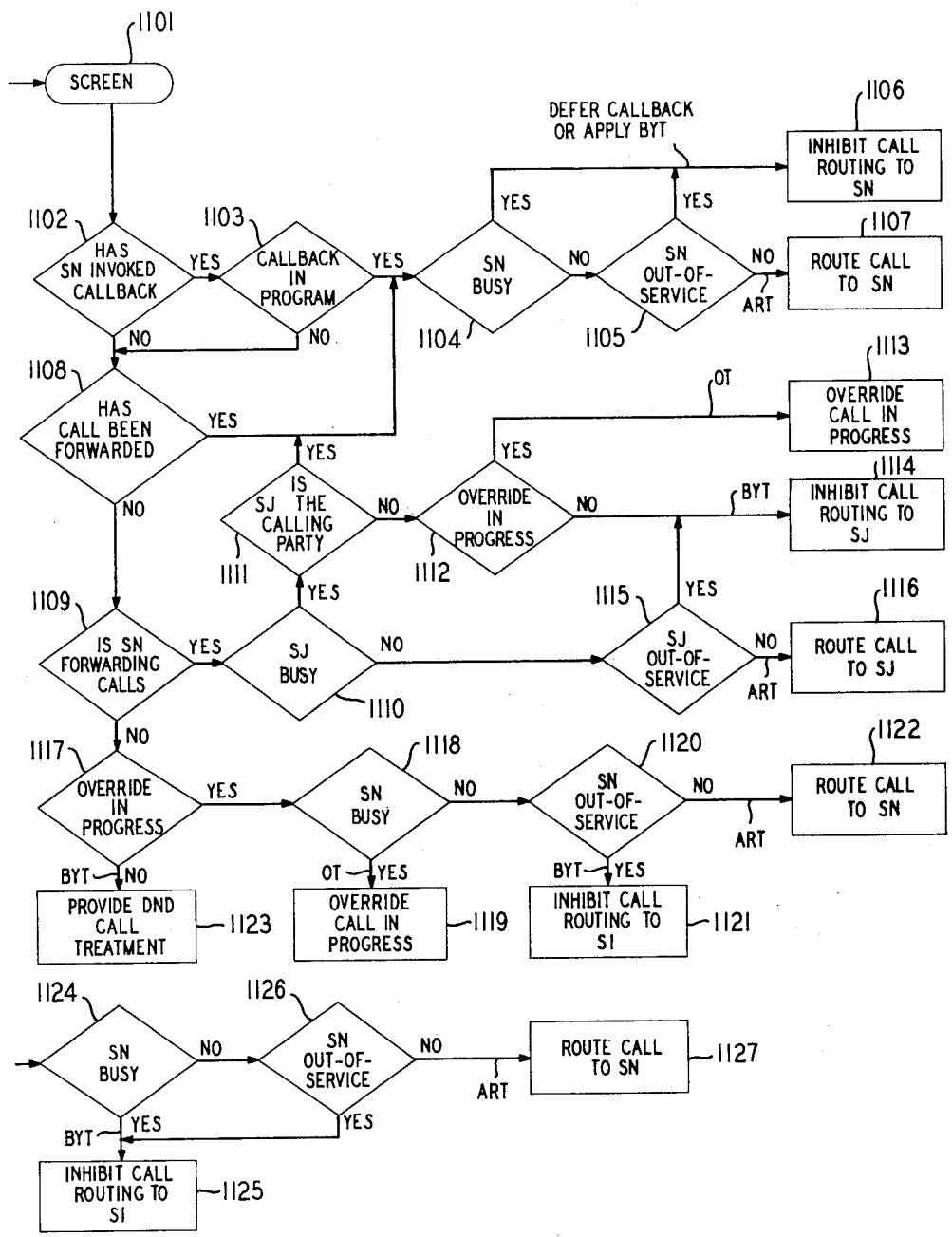

The call screening features are initiated only when a Do-Not-Disturb feature has been activated at station SN and are illustrated with reference to FIG. 12. Note, if the call screening features are not available in the system, then the Yes output of decision block 1003 (FIG. 10) would connect into decision block 1117 (FIG. 11). Thus, the questions represented by decision blocks 1102, 1108 and 1109 enable the system to provide the call screening features.

If station SN has activated the Do-Not-Disturb feature and has also activated the Callback (1102) feature the callback is in progress (1103) and station SN is busy (1104), then callback will be suspended and the call inhibited (1106). A similar action will result if station SN is not busy (1104) but is out-of-service (1105). If station SN is neither busy (1104) nor out-of-service (1105) then station SN is alerted. The above paragraphs describe the operation of the Callback with Do-Not-Disturb (ACBK+DND) feature.

If station SN has neither activated callback (1202) or if callback is activated but not in progress (1103) then the program inquires into whether the call has been forwarded (1108) from another station (i.e., station SN is the forward alternate). If the above answer is affirmative then the busy status at station SN is checked (1104) as described above (if affirmative, busy tone is returnd to S1). If station SN is not the forward alternate then an inquiry is made if station SN is forwarding calls (1109).

If station SN has activated the Do-Not-Disturb feature (1003) as well as in the Call Forwarding feature (1109) this results in another call screening feature called "Call Forwarding with Do-Not-Disturb" (CFWD+DND). If the forward alternate station SJ is busy (1110) and is also the calling party (1111) then an attempt is made to connect station SJ with station SN (1104). If alternate station SJ is busy (1110) but is not the calling station (1112) then an inquiry is made to determine if this is an override call (1112). If override is in progress, then an override tone is applied to station SJ as an indication to station SJ that override has been activated and station S2 will be attached to station SJ after tone application (1113). If no override call is in progress a busy tone (BYT) is returned to calling station S2 (1114).

If station SJ is not busy (1110) and is out-of-service (1115) a busy (BYT) tone is returned to calling station S2. If station SJ is not out-of-service an audible ringback tone (ART) is returned to calling station S2 indicating that the forward alternate station SJ is ringing (1116).

If station SN is not forwarding calls (1109) and an override is not in progress (1117) then standard Do-Not-Disturb feature treatment is carried out and a busy tone (BYT) is returned to calling station S2.

In the Do-Not-Disturb feature the visual signal to the called station will flash indicating a call is being attempted. In addition, the voice facility is connected through to the called station. Thus, the user at a station activating the Do-Not-Disturb feature can still answer his phone if desirable. Thus, Do-Not-Disturb as implemented silences the audible but not the visual signaling to a called station. Obviously, both audible and visual signaling can be blocked at the called station if desirable.

If an override call to station SN is in progress (1117) and if station SN is busy (1118) then an override tone indicating such is applied to called station SN. If station SN is not busy (1118) but is out-of-service (1120) a busy tone (BYT) is returned to calling station S2. If station SN is neither busy nor out-of-service an audible ringback tone (ART) is returned to calling station S2 indicating that the call has been connected as dialed (1122) and Do-Not-Disturb activation has been breached.

The table of FIG. 12 illustrates the various combinations in which the disclosed call screening features can be arranged as well as the resulting call treatment at the affected stations. In addition FIG. 12 illustrates the differencess in call treatment between the standard features and the disclosed call screening features. The first six features listed in FIG. 12 illustrate the standard features without a screening function. One column of the table illustrates the station to which a call is directed and a second column illustrates the call treatment at the affected stations.

With reference to FIG. 12, when a station SN to station S1 intercom call (1201) is made station S1 receives a visual (V) and audible (R) indication (commonly implemented as a flashing lamp and ring signal). In addition, the intercom system would arrange the voice connection so that station SN can answer by pressing the intercom pick-up key and going off-hook at a key station set or by just going off-hook at a non-key station set.

When a Do-Not-Disturb feature is activated at station S1 (1202) a call to station S1 results in a visual (L) indication but no audible indication (R). A voice connection is made to station set S1 and hence a party at station S1 is given the option to answer the call when he sees the visual indication (L).

A Call Forward feature (1203) with station S1 as the activator and station SN as the alternate results in the call treatment shown. Thus a call to station S1 results in a visual (L) and audible (R) signals in addition to a voice connection (V) capability at both stations S1 and SN. Note, however, that a call from alternate station SN to activator station S1 is not forwarded back to alternate station SN but results in a visual (L) signal, audible (R) signal and voice connection (V) capability at only activator station S1.

A Callback feature (1204) activated with station S1 as the activator and a previously called busy station as the designate results in the call treatment shown. As discussed previously, when the designate station is no longer busy station S1 will automatically receive a visual (L) signal, audible signal (R) and voice connection (V) capability.

A Call Forward feature activated with station S1 as the activator and station SN as the alternate followed by a Call Forward feature activated with station SN as the activator and station SJ as the alternate results in the call treatment shown in 1205 of FIG. 12. Since the intercom system does not forward forwarded calls, incoming calls to station S1 terminate at only stations S1 and SN. Likewise, a call to station SN is terminated at stations SN and SJ. As discussed previously when the alternate station SN or SJ call their respective activator station S1 or S2 respectively the call is not forwarded back to the alternate station but terminates at the activator station.

As shown in 1206 of FIG. 12 when a Call Forward feature is activated at station S1 and is followed by a Callback feature activated at station S1 the illustrated call treatment results. Thus, all calls to station S1 are received at stations S1 and SN. However, as discussed previously, calls from station SN to station S1 are only received at station S1. In addition, a callback call to station S1 received at station S1 only and station SN receives no indications of the call.

The various call screening features are illustrated in blocks 1206 to 1211 of FIG. 12. The Call Forwarding with Do-Not-Disturb feature is shown in 1207. Thus, intercom calls directed to station S1 would terminate at stations S1 and SN. Intercom calls to station SN, however, give a visual indication (L) and voice connection (V) capability at only station SN. Thus, selective screening results since an audible ring signal (R) is given at station SN for calls forwarded to station SN from station S1, whereas no audible ring signal (R) is given for direct (non-forwarded) calls to station SN. Note, if the order of the feature activation shown in 1207 is reversed the call forwarding to station SN is disallowed and hence no selective screening results.

Another call screening feature arrangement is illustrated in 1208 where a Do-Not-Disturb feature is followed by Call Forward feature at station S1. The resulting call treatment prohibits calls to station S1 and does not provide the usual call termination treatment (i.e., visual (L) indication, an audible (R) indication, or a voice connection (V) capability) at station S1. Thus, the visual (L) indication and voice connection (V) associated with the DND feature have also been forwarded to station SR leaving station S1 totally out of the connection path. Station SN, however, receives visual (L) audible (R) and voice connection (V) capability on calls to station S1. Note by comparison with feature 1207 the DND at station S1 of feature 1208 has totally screened station S1 from participating in any calls addressed to station S1.

The Callback with Do-Not-Disturb feature is shown in 1209 of FIG. 12. In this screening feature, as discussed in detail previously, only the callback call to station S1 bypasses the DND screen to give an audible (R) indication at station S1. Note, the order of activation of the features shown in 1209 does not change the resulting screening at station S1. The above screening feature is described in FIG. 10 and FIG. 11 by the path consisting of blocks 1003, 1101, 1102, 1103, etc.

As shown in 1210 a sequential operation of a Call Forwarding feature at station S1 (to station SN) followed by a Do-Not-Disturb feature at station SN followed by a Call Forwarding feature at station SN (to SJ) results in another screening arrangement. The screening features of 1210 is a combination of the screening features of 1207 and 1208. Thus, only calls to station S1 which have been forwarded to station SN result in the usual visual (L), audible (R) and voice connection (V) capability at stations S1 and SN. Calls to station SN are not available to station SN but result in visual (L), audible (R), and voice connection (V) capability at only station SJ. As noted previously a call to station S2 from station SJ would also provide visual (L), audible (R) and voice connecting (V) capability at station SN. The above screening feature is described in FIG. 10 and FIG. 11 by the path consisting of blocks 1003, 1101, 1102, 1108, 1109, 1110, etc.

The screening feature shown in 1211 of FIG. 12 requires a sequential operation of a Call Forwarding feature at station S1 followed by a Do-Not-Disturb feature at station SN followed by a Call Forwarding feature at station SN followed by a Callback feature at station SN. The screening feature of 1211 is that of screening feature of 1210 with an additional Callback feature activated at station SN. The resulting call treatment of 1211 is the same as 1210 except that callback calls to station SN provide visual (L), audible (R) and voice connecting (V) capability at station SN. The resulting screening feature is doubly selective and allows only forwarded and callback calls to reach station SN. As noted previously, a call to station SN from station SJ would also provide visual (L), audible (R) and voice connecting (V) capability at station SN. The resulting call screening feature 1211 is described in FIG. 10 and FIG. 11 by the path consisting of blocks 1003, 1101, 1102, 1108, 1104, etc.

What has been described is merely illustrative of my invention, other embodiments known to one skilled in the art could minimize any of the disclosed limitations. Some of the limitations of the disclosed system are based on timing, speed of the processor or on the allocation or size of the associated memory. In additon, other arrangements of audible or visual alerting signals or sequencing tones associated with the various features can be utilized without deviating from my invention.

Other applications to telephone or other communication systems other than the disclosed intercom system are contemplated as being within the knowledge of one skilled in the art.

I claim:

1. A selective call screening arrangement for use in a telephone system having a plurality of stations each having a capability of communication with other stations through a switching network internal to said system, said switching network having a communication facility extending to each of said stations and each of said stations having a signaling means operable to establish a call feature and a dialing means to establish a communication call connection to said station, Characterized in that said call screening arrangement includes means central to said stations for storing a plurality of call screening means, said call screening means including a call blocking routine arranged to block a communication call addressed to a first selected station, and a call completion routine associated with a second selected station and arranged to bypass said blocking routine at said first selected station;

means responsive to signals received from one of said stations for selecting one of said call screening means;

means central to said stations for storing an address of another one of said stations, said address being received from signaling means at said one of said stations;

means enabled under joint control of a first selected call screening means and said address storing means for marking a first selected station for call blocking in accordance with said first selected call screening means;

means enabled under joint control of said first selected call screening means and said address storing means for marking a second selected station for call completion in accordance with said first selected call screening means; and means responsive to communication connections addressed to said first selected station or said second selected station for enabling the completion of said call in accordance with said first selected call screening means.

2. The invention set forth in claim 1 wherein said call completion routine of said first selected call screening means is arranged to bypass said call blocking routine at said first selected station by alerting said first selected station in response to a communication connection associated with said second selected station.

3. The invention set forth in claim 2 wherein said call completion routine includes call forwarding means arranged to forward a communication call addressed to said second selected station to said first selected station.

4. The invention set forth in claim 2 wherein said call screening means is activated during a busy condition detected on an attempted communication call to said another one of said stations from said one of said stations, said one of said stations being said first selected station and said another of said stations being said second selected station and wherein said call completion routine includes callback means arranged to bypass said call blocking routine and alert said first selected station when said second selected station is in a non-busy condition.

5. The invention set forth in claim 1 wherein said call completion routine of said first selected call screening means is arranged to bypass said call blocking routine at said first selected station by forwarding a call addressed to said first selected station to said second selected station without alerting said first selected station.

6. The invention of claim 1 wherein said telephone system includes a key telephone system connected to a telephone line from a central office, said key telephone system arranged to interface with said switching network of said telephone system using lamp signals which provide visual status of said central office telephone line and where an "A" lead provides active or inactive status of said central office telephone line.

7. The invention set forth in claim 1 wherein said call screening storing means further includes call completion memory means for storing station address information associated with said call completion routine, said memory means arranged as a common station shared system memory including means for storing said first selected station address, and means for storing said second selected station address.

8. The invention set forth in claim 1 wherein said call screening storing means further comprises call routine status memory means for storing call routine status information associated with said first and second selected stations, said call routine status memory means generated as a temporary status memory during operation of said enabling means.

9. The invention set forth in claim 1 wherein said switching network includes a plurality of communication links, each of said links capable of connecting together a plurality of communication facilities and wherein said call screening arrangement further comprises a facility status memory means for storing call status data on said facility associated with each said station during the operation of said enabling means, and a link status memory for storing link status data on each said link of said system during the operation of said enabling means.

10. A selective call screening arrangement for use in a telephone system having a plurality of stations each having a capability of communication with other stations through a switching network internal to said system, said switching network having a communication facility extending to each said station and each of said stations having a signaling means operable to establish a call feature and a dialing means to establish a communication connection to said station, CHARACTERIZED IN THAT said call screening arrangement includes means for activating said call screening arrangement from signals sent from said signaling means of a first station, said call screening arrangement designed to forward an incoming call addressed to said first station to a second station while blocking an incoming call addressed to said second station;

means for accepting an address of said second station from a dialing code subsequently entered using said dialing means at said first station; and means controlled by said activating means and said accepting means for enabling said activated call screening arrangement to block an incoming call addressed to said second station while allowing an incoming call addressed to said first station to be forwarded to said second station.

11. The invention set forth in claim 10 wherein said activating means includes a means for detecting a multifrequency signal received from said first station.

12. The invention set forth in claim 11 wherein said dialing means of said first station includes a means for generating a multifrequency signal.

13. The invention set forth in claim 10 wherein said activating means includes means for activating a call forwarding feature at said first station which includes selection of said second station at which an incoming call to said first station is also received, and means for subsequently activating a do-not-disturb call blocking feature at said second station which enables said second station to appear busy to said incoming call to said second station.

14. The invention set forth in claim 13 wherein said accepting means further includes call forward memory means for storing station address information associated with said call forwarding activation means, said memory means arranged as a common station shared system memory including means for storing said first station address, and means for storing said second station address.

15. The invention set forth in claim 14 wherein said accepting means includes do-not-disturb memory means for storing do-not-disturb feature activation status of all said stations of said system, said memory means arranged as a common station shared system memory.

16. The invention set forth in claim 15 wherein said call screening arrangement further comprises feature status memory means for storing feature status information of said first and second stations, said feature status memory means generated as a temporary status memory during operation of said enabling means.

17. The invention set forth in claim 15 wherein said switching network includes a plurality of communication links, each of said links capable of connecting together a plurality of communication facilities and wherein said call screening arrangement further comprises a facility status memory means for storing call status data on said facility associated with each said station during the operation of said enabling means, and a link status memory for storing link status data on each said link of said system during the operation of said enabling means.

18. The invention of claim 13 wherein said telephone system includes a key telephone system connected to a telephone line from a central office, said key telephone system arranged to interface with said switching network using lamp signals which provide visual status of said central office telephone line and where an "A" lead provides active or inactive status of said central office telephone line.

19. The invention set forth in claim 10 wherein said activating means further activates a capability in said call screening arrangement for forwarding said blocked incoming calls addressed to said second station to a third station, said accepting means further accepts an address of said third station, and said enabling means enables said activated call screening arrangement to forward said blocked incoming call addressed to said second station to said third station.

20. The invention set forth in claim 19 wherein said activating means includes means for activating a call forwarding feature at said first station which selects a second station at which an incoming call to said first station is also received, means for subsequently activating a do-not-disturb call blocking feature at said second station which enables said second station to appear busy to said incoming call to said second station, and means for subsequently activating a call forwarding feature at said second station which selects said third station to which an incoming call to said second station is also received.

21. A selective call screening arrangement for use in a telephone system having a plurality of stations each having a capability of communication with other stations through a switching network internal to said system, said switching network having a communication facility extending to each said station and each of said stations having a signaling means operable to establish a call feature and a dialing means to establish a communication connection to said station, CHARACTERIZED IN THAT said call screening arrangement includes means for activating said call screening arrangement from a first station by signals sent from said signaling means of said first station following an attempted call to a busy second station, said activated call screening arrangement designed to audibly signal said first station when said second station is no longer busy while blocking an incoming call addressed to said first station;

means for accepting an address of said second station from a dialing code subsequently entered using said dialing means at said first station; and means controlled by said activating means and said accepting means for enabling said activated call screening arrangement to block said incoming call addressed to said first station set, while allowing an audible signal to said first station when said second station is no longer busy.

22. The invention set forth in claim 21 wherein said activating means includes means for detecting a multifrequency signal received from said first station.

23. The invention set forth in claim 22 wherein said dialing means of said first station includes a means for generating a multifrequency signal.

24. The invention set forth in claim 21 wherein said call screening activating means includes means for activating a callback feature at said first station for receiving at said first station a callback signal from said previously called busy second station, said callback signal indicating a non-busy condition at said second station, and means for activating a do-not-disturb call blocking feature, which enables said first station to appear busy to said incoming call to said first station.

25. The invention set forth in claim 24 further comprising callback memory means for storing station address information associated with said callback feature activating means, said memory means arranged as a common station shared system memory including means for storing an address of said first station, means for storing an address of said second station, and means for storing a timer value indicating the length of time said callback feature has been activated.

26. The invention set forth in claim 25 wherein said accepting means includes do-not-disturb memory means for storing do-not-disturb feature activation status of all said stations of said system, said memory means arranged as a common station shared system memory.

27. The invention set forth in claim 26 wherein said call screening arrangement further comprises feature status memory means for storing feature status information of said first and second stations, said feature status memory means generated as a temporary status memory during operation of said enabling means.

28. The invention set forth in claim 27 wherein said switching network includes a plurality of communication links, each of said links capable of connecting together a plurality of communication facilities and wherein said call screening arrangement further comprises a facility status memory means for storing call status data on said facility associated with each said station during the operation of said enabling means, and a link status memory for storing link status data on each said link of said system during the operation of said enabling means.

29. The invention of claim 24 wherein said telephone system includes a key telephone system connected to a telephone line from a central office, said key telephone system arranged to interface with said switching network using lamp signals which provide visual status of said central office telephone line and where an "A" lead provides active or inactive status of said central office telephone line.

30. A selective call screening arrangement for use in a telephone system having a plurality of stations each having a capability of communication with other stations through a switching network internal to said system, said switching network having a communication facility extending to each said station and each of said stations having a signaling means operable to establish a call feature and a dialing means to establish a communication connection to said station, CHARACTERIZED IN THAT said call screening arrangement includes means for activating said call screening arrangement from a first station by signals sent from said signaling means of said first station, an call screening arrangement when activated designed to forward an incoming call addressed to said first station to a second station set while blocking said incoming call to said first station;

means for accepting an address of said second station set from a dialing code subsequently entered using said dialing means at said first station; and means controlled by said activating means and said accepting means for enabling said activated call screening arrangement to block said incoming call addressed to said first station and forward said incoming call to said second station.

31. The invention set forth in claim 30 wherein of said activating means includes a means for generating a multifrequency signal source at said first station.

32. The invention set forth in claim 31 wherein said dialing means of said first station includes a means for generating a multifrequency signal.

33. The invention set forth in claim 30 wherein said call screening activating means includes means for activating a do-not-disturb call blocking feature at said first station which enables said first station to appear busy to an incoming call to said first station, and means for subsequently activating a call forwarding feature at said first station which selects said second station at which said incoming call to said first station is also received.

34. The invention set forth in claim 33 wherein said accepting means further includes call forward memory means for storing station address information associated with said call forwarding activating means, said memory means arranged as a common station shared system memory including means for storing a first station address, and means for storing said second station address.

35. The invention set forth in claim 34 wherein said accepting means includes do-not-disturb memory means for storing do-not-disturb feature activation status of all said stations of said system, said memory means arranged as a common station shared system memory.

36. The invention set forth in claim 35 wherein said call screening arrangement further comprises feature status memory means for storing feature status information of said first and second stations, said feature status memory means generated as a temporary status memory during operation of said enabling means.

37. The invention set forth in claim 36 wherein said switching network includes a plurality of communication links, each of said links capable of connecting together each said communication facilities and wherein said call screening storing means further comprises a facility status memory means for storing call status data on said facility associated with each said station during the operation of said enabling means, and a link status memory for storing link status data on each link of said system during the operation of said enabling means.

38. The invention of claim 37 wherein said telephone system includes a key telephone system connected to a telephone line from a central office, said key telephone system arranged to interface with said switching network using lamp signals which provide visual status of said central office telephone line and where an "A" lead provides active or inactive status of said central office telephone line.

39. The invention set forth in claim 30 wherein said activating means further activates a capability in said call screening arrangement for providing an audible callback signal to said first station from a previously called busy third station, said callback signal indicating a non-busy condition at said third station, said accepting means further accepts an address of said third station, and said enabling means enables said activated call screening arrangement to provide a callback signal to said first station from a previously called busy said third station, said callback signal indicating a non-busy condition at said third station.

40. The invention set forth in claim 39 wherein said activating means includes
- means for activating a do-not-disturb call blocking feature at said first station which enables said first station to appear busy to an incoming call to said first station,
- means for subsequently activating a call forwarding feature at said first station which selects said second station to which said incoming call to said first station is also received, and
- means for subsequently activating a callback feature at said first station for receiving at said first station a callback signal from a previously called busy said third station, said callback signal indicating a non-busy condition at said third station.

41. The invention set forth in claim 30 wherein
said activating means further activates a capability in said call screening arrangement for allowing a forwarded incoming call addressed to said first station to be received at said second station while blocking an incoming call addressed to said second station, and
said enabling means enables said activated call screening arrangement to block said incoming call to said second station.

42. The invention set forth in claim 41 wherein said activating means includes
- means for activating a do-not-disturb call blocking feature at said first station which enables said first station to appear busy to an incoming call to said first station,
- means for subsequently activating a call forwarding feature at said first station which selects said second station at which said incoming call to said first station is also received, and
- means for subsequently activating a do-not-disturb call blocking feature at said second station which enables said second station to appear busy to an incoming call to said second station.

* * * * *